*(12)* United States Patent
Prasad et al.

(10) Patent No.: US 7,321,553 B2
(45) Date of Patent: Jan. 22, 2008

(54) METHODS AND APPARATUS FOR ASSERTING FLOW CONTROL AT INPUT PORTS OF A SHARED-MEMORY SWITCH

(75) Inventors: Ajith Prasad, Bangalore (IN); Ananthan Ayyasamy, Bangalore (IN); Jain Philip, Bangalore (IN); Paritosh Joshi, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 992 days.

(21) Appl. No.: 10/624,995

(22) Filed: Jul. 22, 2003

(65) Prior Publication Data

US 2005/0018708 A1   Jan. 27, 2005

(51) Int. Cl.
*H04L 1/00*   (2006.01)
(52) U.S. Cl. ...................................... 370/230; 370/412

(58) Field of Classification Search ................ 370/229, 370/230, 232, 235, 412
See application file for complete search history.

(56) References Cited

U.S. PATENT DOCUMENTS

| 5,233,606 | A  | * | 8/1993  | Pashan et al. ............... 370/418 |
| 5,541,912 | A  | * | 7/1996  | Choudhury et al. ......... 370/412 |
| 6,219,728 | B1 | * | 4/2001  | Yin .............................. 710/52 |
| 6,636,523 | B1 | * | 10/2003 | Lau et al. ..................... 370/415 |
| 7,139,280 | B2 | * | 11/2006 | Mansour et al. ............. 370/412 |

* cited by examiner

*Primary Examiner*—Ricky Q. Ngo
*Assistant Examiner*—Dady Chery
(74) *Attorney, Agent, or Firm*—Buckley, Maschoff & Talwalkar LLC

(57) ABSTRACT

In a method of allocating a shared resource among a plurality of competing applicants, a share of the resource allocated to one of the applicants is limited on the basis of a current proportion of the resource allocated to the applicant and a total of respective shares of the resource currently allocated to all of the applicants.

28 Claims, 11 Drawing Sheets

METHODS AND APPARATUS FOR ASSERTING FLOW CONTROL AT INPUT PORTS OF A SHARED-MEMORY SWITCH

BACKGROUND

When congestion occurs at a data communication switch, it may be necessary to assert flow control at one or more input ports of the switch. However, conventional flow control assertion procedures may cause inefficient use of packet storage memory and/or may unfairly disadvantage input ports that contribute little to existing congestion.

DETAILED DESCRIPTION

Figure 1:
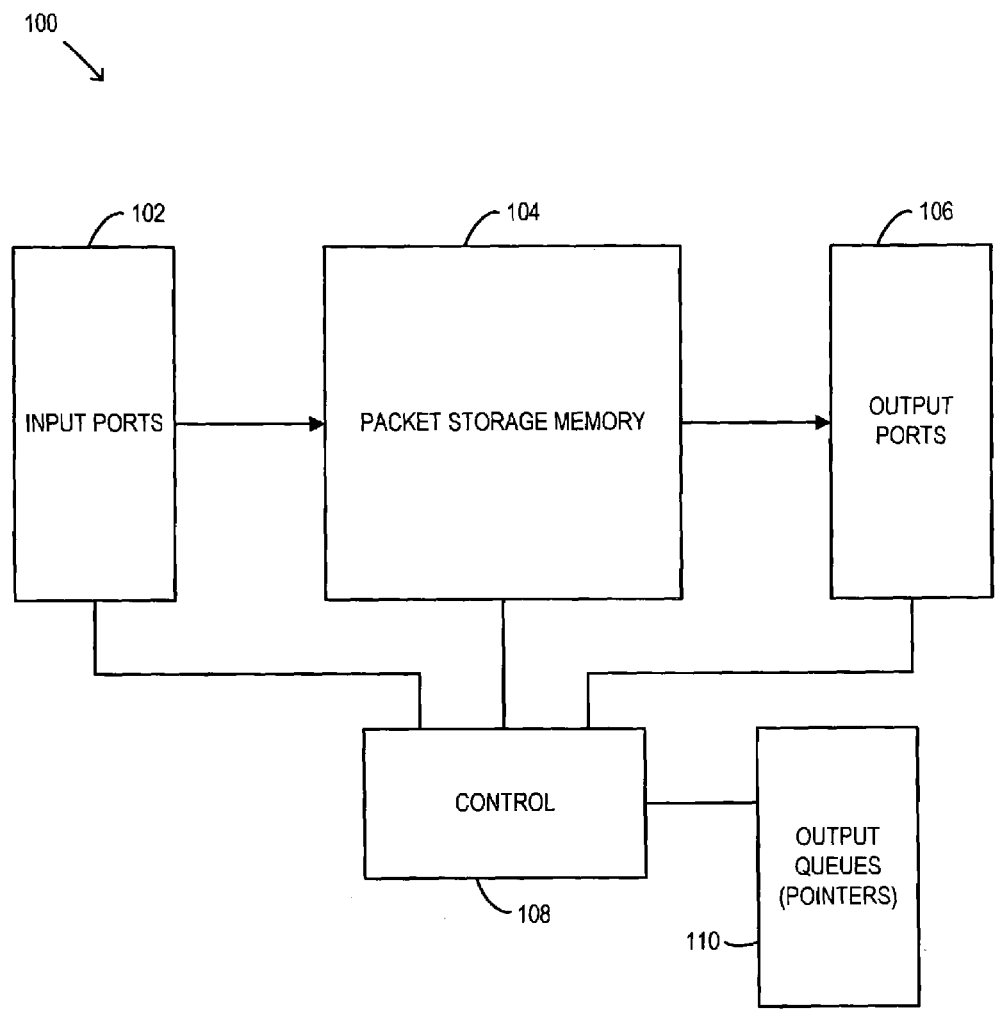
FIG. 1 is a simplified block diagram of a data communication switch according to some embodiments.

FIG. 1 is a block diagram of a data communication switch 100 according to some embodiments. The switch 100 includes a plurality of input ports 102 and a packet storage memory 104 coupled to the input ports. A plurality of output ports 106 is coupled to the packet storage memory. In general, inbound data packets are received at the input ports 102 and are buffered in the packet storage memory 104, pending dispatching of the packets via the output ports 106.

A control circuit 108 is coupled to the input ports, to the packet storage memory and to the output ports. The control circuit refers to output queues 110 in determining the order in which to dispatch packets from the packet storage memory via the output ports. In accordance with conventional practices, the output queues may contain pointers to the locations in the packet memory at which specific packets are stored.

The data communication switch 100 may include other components, which are not shown in order to simplify the drawing.

According to some embodiments, the control circuit 108 implements strategies for asserting flow control for the input ports. These strategies will initially be described in conceptual terms with reference to FIGS. 2 through 4.

Figure 2:
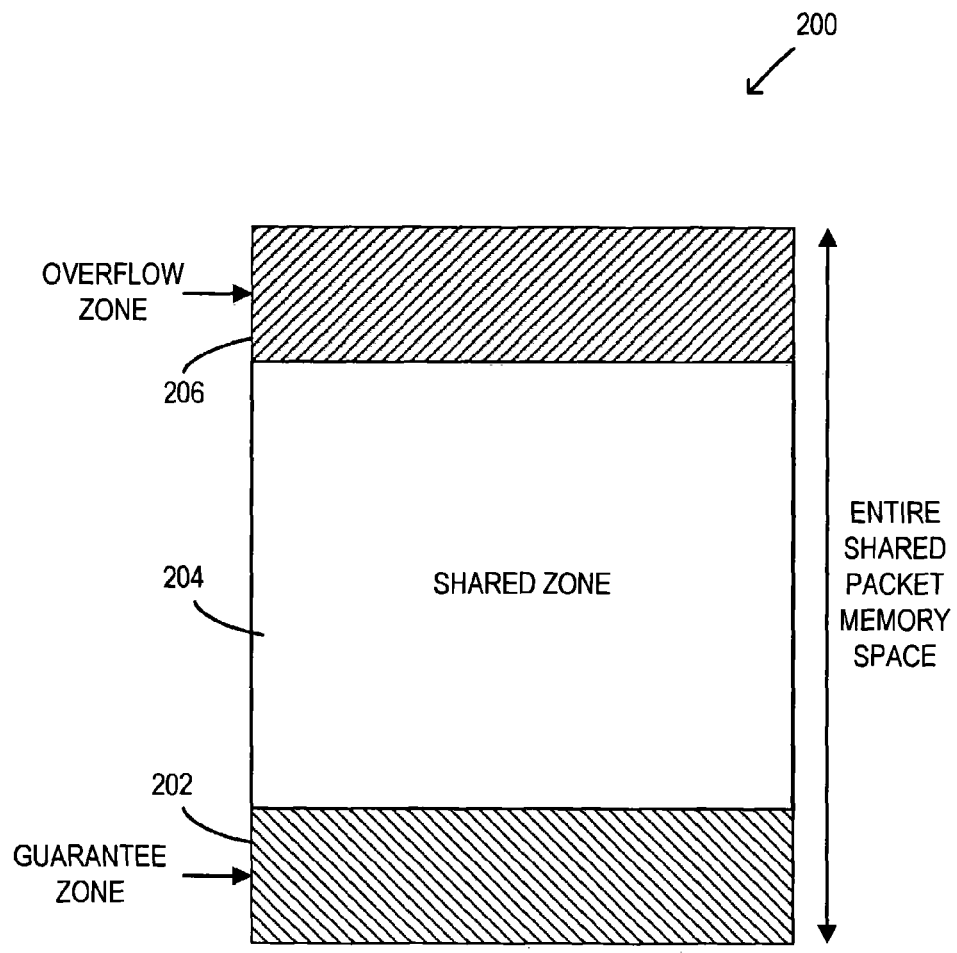
FIG. 2 schematically illustrates partitioning of a packet storage memory space according to some embodiments.

FIG. 2 schematically illustrates a virtual partitioning of the memory space of the packet storage memory 104 as implemented by operation of the control circuit 108. In FIG. 2, reference numeral 200 generally indicates the entire packet storage memory space. The entire packet storage memory space 200 is virtually partitioned into three "zones", namely a guarantee zone 202, a shared zone 204, and an overflow zone 206. Although each of the zones is illustrated as being fixed and unified in location, in practice each zone may be formed of a number of discontinuous regions in the packet storage memory 104, and the locations of those regions may be changed over time.

One strategy that may be implemented by the control circuit 108 is to guarantee a minimum quantity of packet storage memory to store packets received at each input port. The guarantee zone 202 represents the sum of the minimum guaranteed packet storage memory resources for all of the input ports.

As its name implies, the shared zone 204 is available for sharing among all of the input ports, in accordance with a procedure to be described below. The overflow zone 206 is used to store packets received at an input port at a time when flow control has been asserted for the input port (i.e., at a time when the input port is not permitted to receive further allocation of the shared zone 204). The overflow zone 206 is provided because flow control may not be effective immediately; that is, there may be some latency between assertion of flow control for an input port and cessation of transmission of packets from a source device (not shown) to the input port.

As will be seen, the control circuit 108 may effectively partition the packet storage memory 104 into the zones 202-206 by the manner in which it allocates portions of the packet storage memory 104 among the input ports 102.

Figure 3:
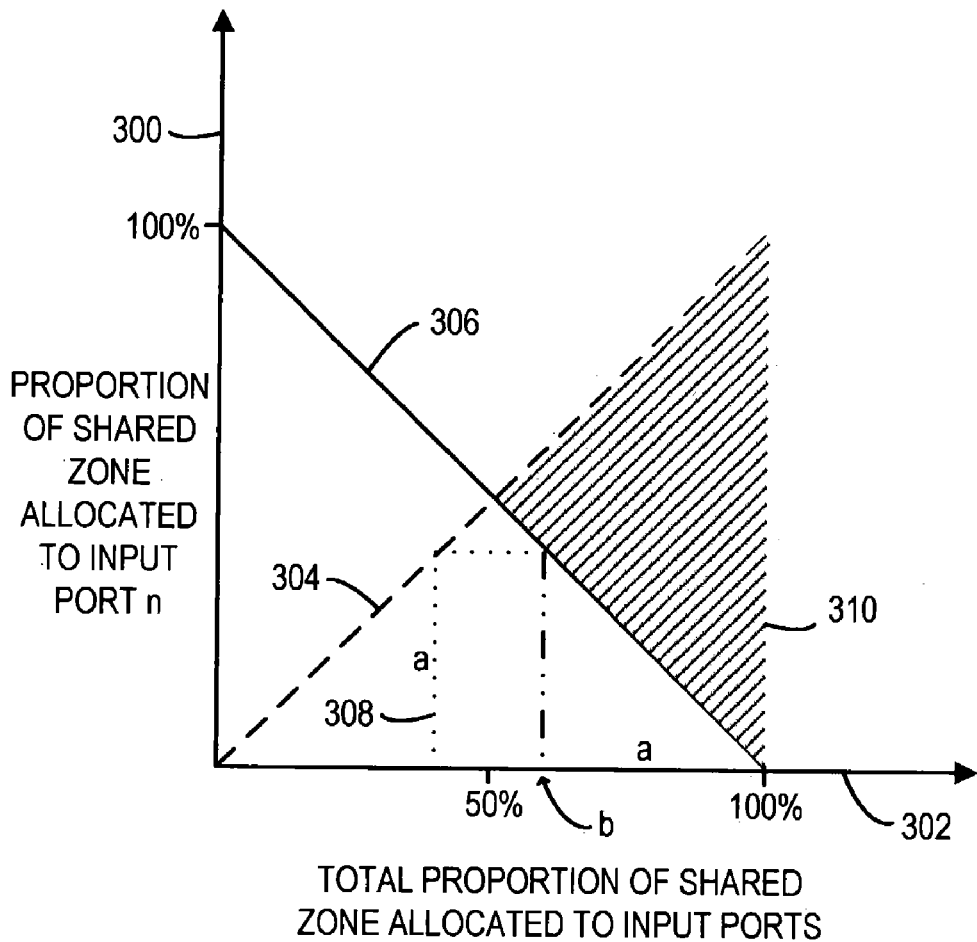
FIG. 3 graphically illustrates a flow control assertion strategy according to some embodiments.
Figure 4:
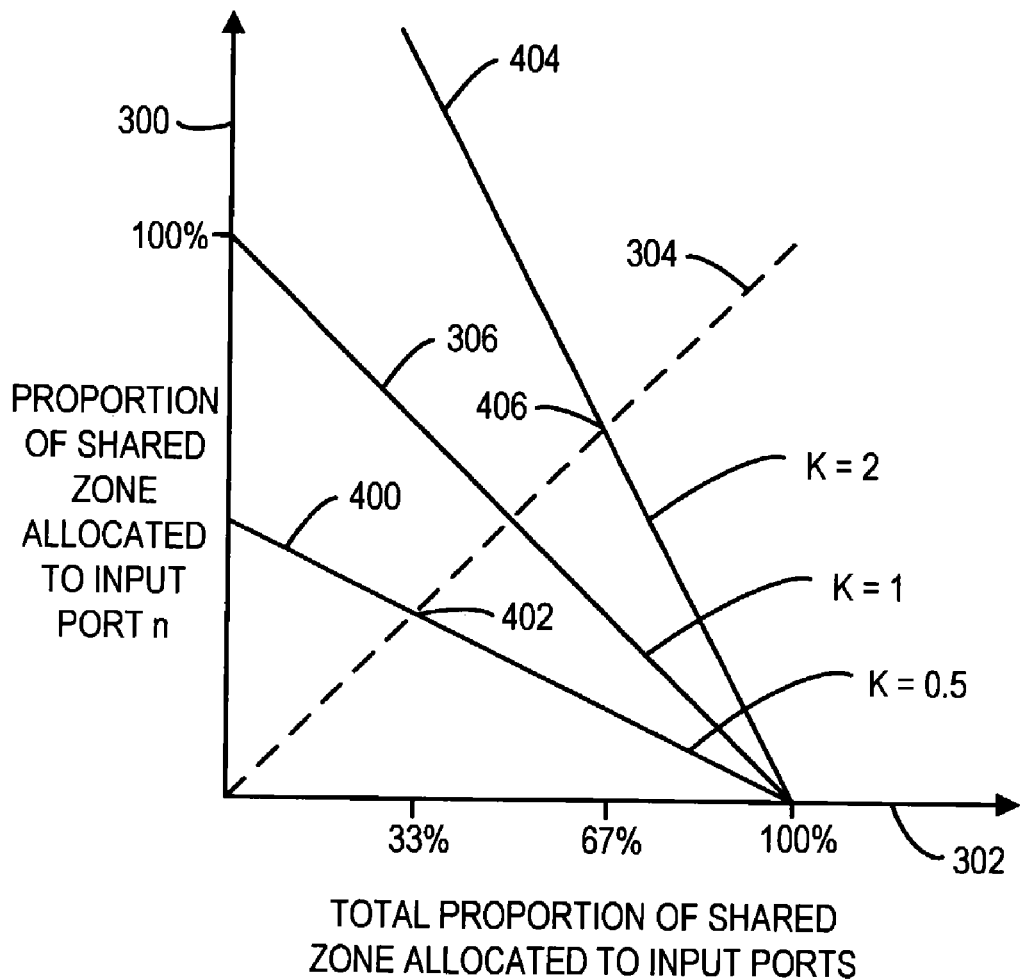
FIG. 4 graphically illustrates the effects of various factors that may be employed to tune the flow control assertion strategy of FIG. 3.

Procedures for utilizing the shared zone 204 according to some embodiments are illustrated in conceptual terms in FIGS. 3 and 4. In FIG. 3, the vertical axis 300 represents the proportion of the shared zone 204 that is currently allocated to a particular input port (say, "port n"). The horizontal axis represents the proportion of the shared zone 204 that is currently allocated to all of the input ports 102, including port n. The graphical representation of FIG. 3 indicates one way in which allocation of the shared zone 204 to port n may be limited on the basis of the current proportion of the shared zone 204 allocated to port n and of the current proportion of the shared zone 204 allocated to all of the input ports. The dashed line 304 simply indicates the constraint that the total proportion of the shared zone 204 that is allocated to all input ports cannot be less than the proportion of the shared zone that is allocated to port n. The solid line 306 indicates operation of a procedure according to some embodiments, in which the proportion of the shared zone that is allocated to port n is not permitted to exceed the currently empty portion of the shared zone (i.e., the proportion of the shared zone that is not currently allocated to any input port). It will be appreciated that the empty portion of the shared zone is equal to the whole of the shared zone, less the total proportion of the shared zone currently allocated to all of the input ports.

To provide a somewhat concrete example, if the amount of the shared zone 204 that is currently allocated to (e.g., in use for) port n is "a", as indicated at 308, it may or may not be the case that flow control may be asserted with respect to port n, depending on the total amount of the shared zone 204 that is currently allocated to (e.g., in use for) all of the input ports other than port n. If "b" is the total amount of the shared zone 204 that is currently allocated to all of the input ports, then flow control is asserted with respect to port n if and only if a>(total size of shared zone−b). With this rule for asserting flow control, the shaded area 310 shown in FIG. 3 represents a "forbidden" area of the space represented by the graph of FIG. 3.

It will be observed that the absolute value of the slope of line 306 is equal to 1. This represents a rule that flow control is asserted with respect to port n if the proportion of the shared zone currently allocated to port n is not less than a constant K times the empty portion of the shared zone, with K=1. With this rule, up to half of the shared zone may be allocated to port n at any given time, if the shared zone is not currently being used for any other port. However, other more or less aggressive flow control procedures may be implemented by varying the value of K. Effects of variations in the value selected for K are conceptually illustrated in FIG. 4.

As in FIG. 3, the line 306 in FIG. 4 represents the flow control procedure with the constant K selected to equal 1. Alternatively, for more aggressive flow control, K could be selected to equal 0.5 (line 400), in which case port n could be allocated up to one-third of the shared zone. (as indicated by the intersection of lines 400 and 304 at point 402) at a time when none of the other input ports are using the shared zone. As another alternative, for less aggressive flow control, K could be selected to equal 2 (line 404), in which case port n could be allocated up to two-thirds of the shared zone (as indicated by the intersection of lines 404 and 304 at point 406) at a time when none of the other input ports are using the shared zone. Other values of K may alternatively be employed.

In addition to the above-described limitation on an input port's allocation in the shared zone based on the port's usage and the usage of all ports of the shared zone, other limitations may be desirable, as described below in connection with FIGS. 5A-5F. For example, an absolute limitation on the usage of the shared zone may be assigned to port n,independent of the amount of usage of the shared zone by the other input ports. This may be particularly desirable in the case of an input port that tends to aggressively use the shared zone. Also, port n may be assigned to a group of input ports and a limitation on the usage of the shared zone by port n may be based on the amount of usage of the other ports in the group in combination with the usage by port n. The latter limitation, when applied across all of the ports of the group, may serve to limit the collective share of the shared zone that may be allocated to the group at any given time.

A more detailed description of a flow control procedure according to some embodiments will now be provided with reference to FIGS. 5A-5F.

Figure 5A:
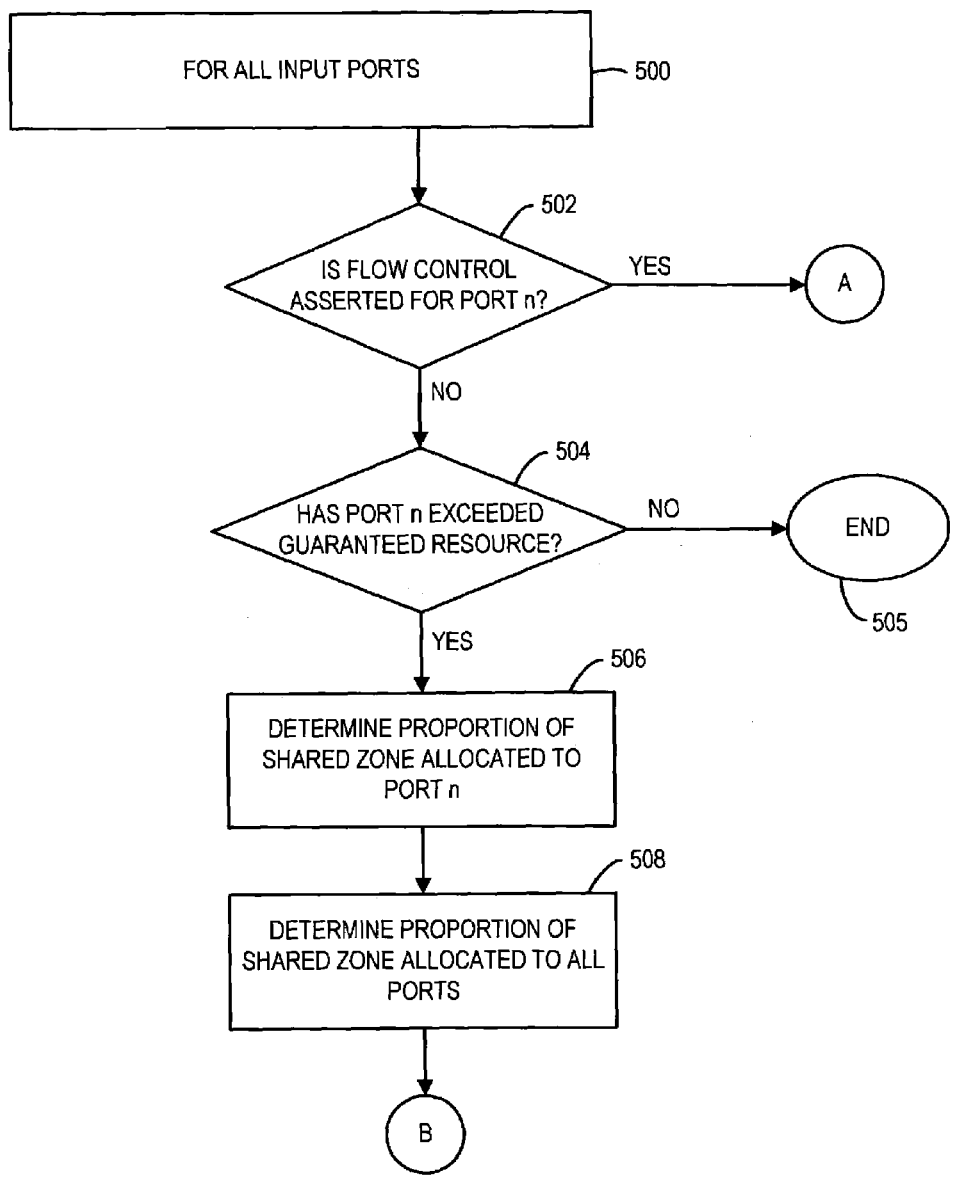
FIGS. 5A through 5F collectively form a flow chart that illustrates operations performed according to some embodiments in connection with assertion and deassertion of flow control in the data communication switch of FIG. 1.
Figure 5B:
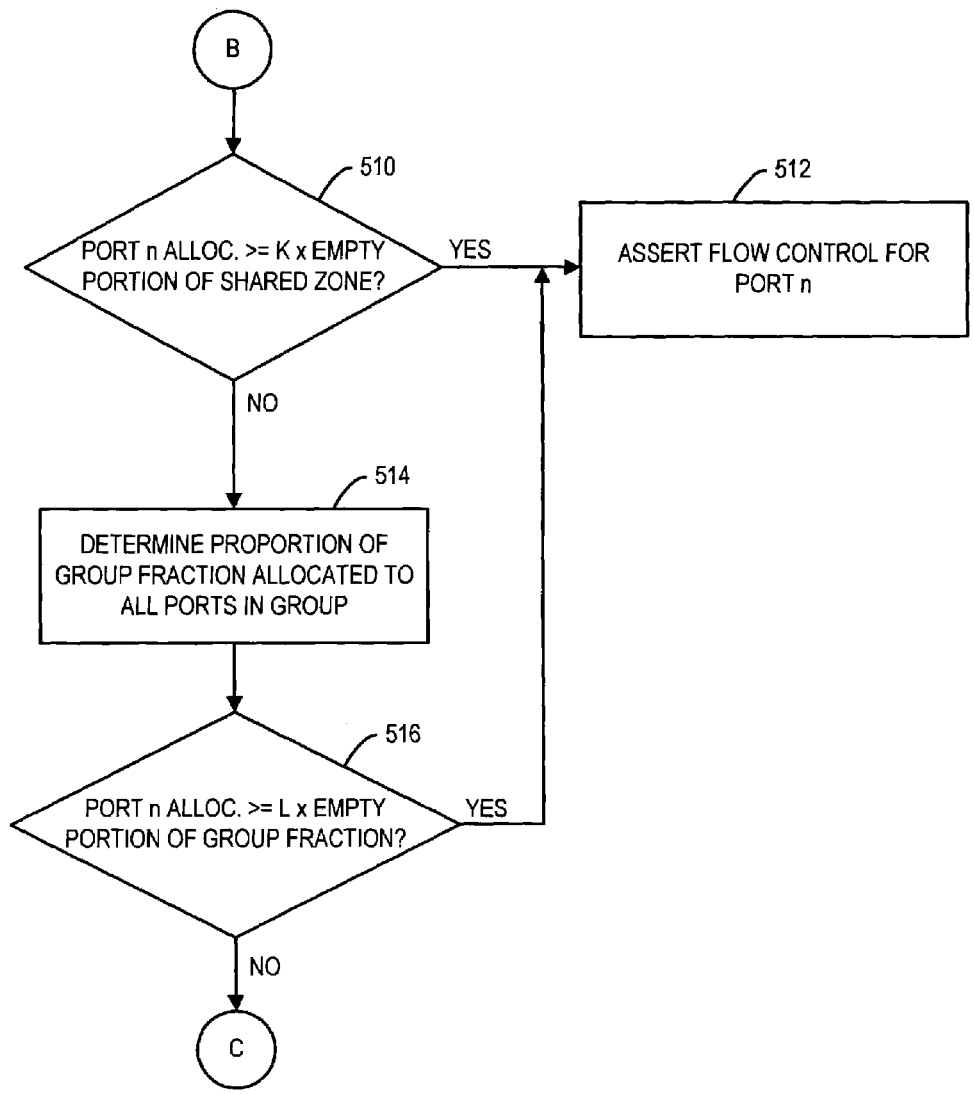
Figure 5C:
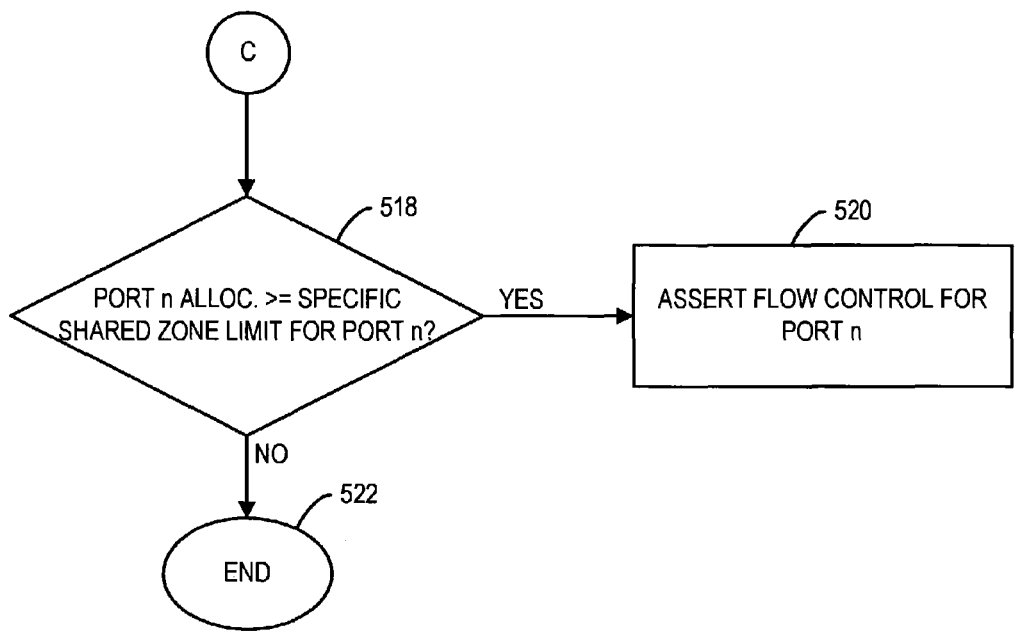
Figure 5D:
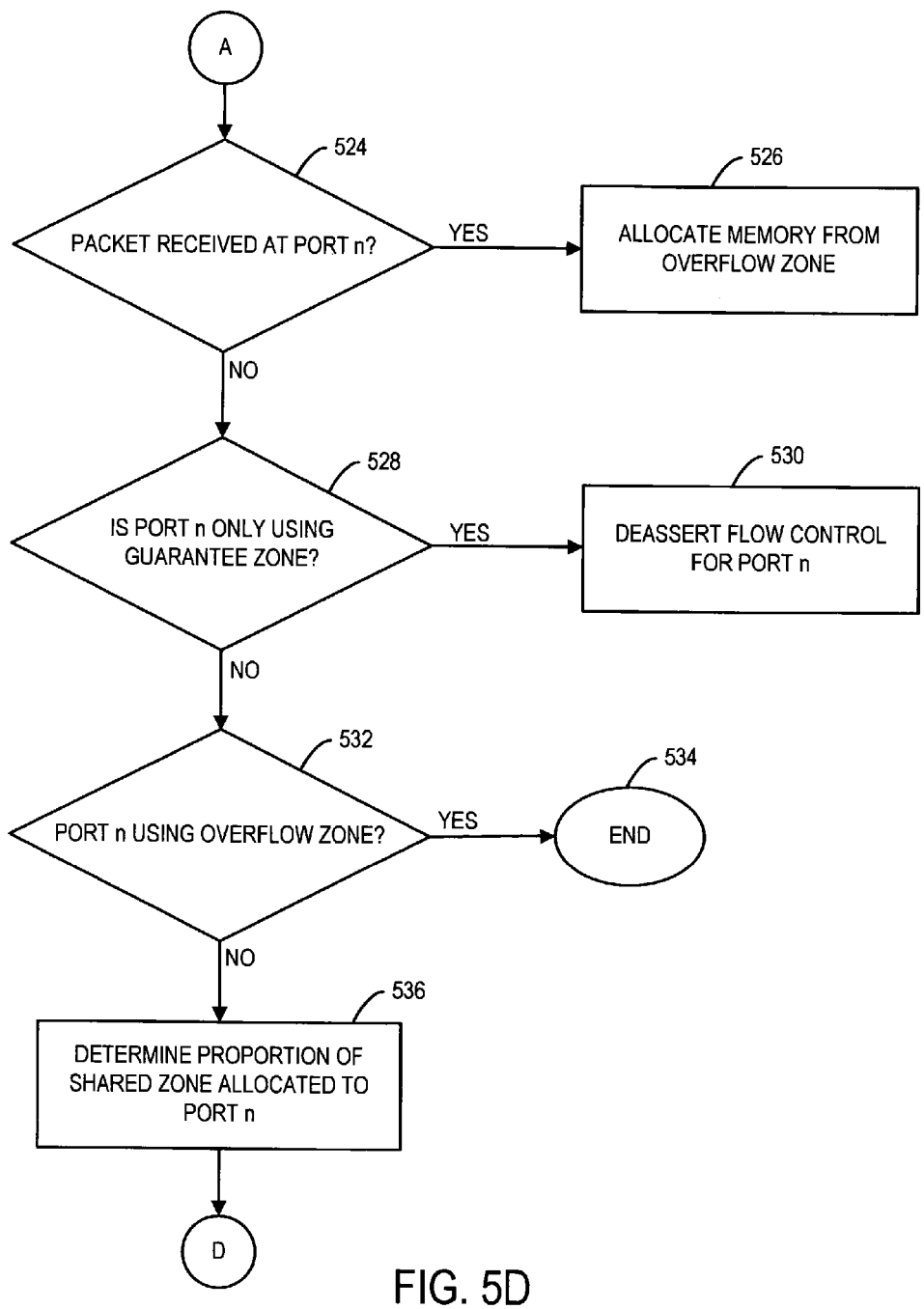

It is indicated at 500 in FIG. 5A that the procedure may be carried out in turn with respect to each input port 102 (FIG. 1). Then, at 502, it is determined for a particular input port (say port n) whether flow control is currently asserted for that port. If not, it is determined at 504 whether port n is utilizing more of the packet storage memory 104 than the portion of the guarantee zone 202 that is reserved for port n. That is, it is determined whether port n has exceeded the guaranteed memory resource set aside for port n in the guarantee zone. If a negative determination is made at 504 (i.e., it is determined that port n is not using any of the shared zone), then the procedure is terminated with respect to port n (as indicated at 505) without asserting flow control with respect to port n.

If a positive determination is made at 504 (i.e., it is determined that port n is using some of the shared zone), then the proportion of the shared zone currently allocated to (in use for) port n is determined, as indicated at 506. This may be done, for example, by referring to a counter that is maintained with respect to port n to indicate what quantity of memory in the packet storage memory 104 is currently used to store ,packets received via port n. The counter may be a hardware counter or a software counter. A similar counter may be maintained for each one of the input ports 102. The determination of the proportion of the shared zone currently allocated to port n may be made by subtracting the quantity of memory assigned to port n in the guarantee zone from the counter value. The proportion of the shared zone currently allocated to port n may be expressed in terms of percentage and/or in terms of memory units, such as bytes. (It will be appreciated that the determination made at 506 may be based on comparing the counter value for port n with the quantity of memory assigned to port n in the guarantee zone.)

Next, at 508, the proportion of the shared zone allocated to all of the input ports may be determined. By the same token, the proportion of the shared zone that is currently empty (i.e., not in use and/or not currently allocated to any of the input ports) may be determined. To make this determination, counters for all of the input ports may be referred to. In some embodiments, the quantity of guaranteed memory resources for each input port is subtracted from the respective counter value for the port. Non-negative results of these subtractions may then be summed, and the resulting sum may be subtracted from the size of the shared zone to arrive at the proportion of the shared zone that is empty. The proportion may be expressed, for example, in terms of percentage and/or in terms of memory units such as bytes.

It is then determined, at 510 (FIG. 5B), whether the proportion of the shared zone currently allocated to port n (as determined at 506) is greater than or equal to (i.e., not less than) the product of the above-referenced constant K times the proportion of the shared zone that is not currently allocated to any of the input ports (as may have been determined at 508). If a positive determination is made at 510 (i.e., it is determined that the amount of the shared zone used by port n is at least equal to K times the empty portion of the shared zone), then flow control may be asserted for port n, as indicated at 512.

Any one of a number of different flow control techniques may be utilized. In general, "flow control" refers to any process that causes or tends to cause data not to be sent to a particular input port. For example, a so-called "pause frame" may be transmitted to the device that is the source of packets for port n, in accordance with practices employed in conventional full-duplex Ethernet networks. As another example, one or another type of "backpressure" may be invoked, as in half-duplex Ethernet networks. As is familiar to those who are skilled in the art, "backpressure" may entail such actions as keeping a transmission line occupied so that the source of the packets cannot send, or asserting or deasserting an appropriate signal on a signal or handshake line to prevent the source from sending further packets.

If a negative determination is made at 510 (i.e., it is found that port n is using less than K times the empty portion of the shared zone), then it may be determined, as indicated at 514, what proportion of a "group fraction" of the shared zone is currently allocated among all ports in a group of input ports to which port n is assigned. It should be understood that "group fraction" refers to a percentage or quantity of the shared zone which is set as an upper limit of the quantity of the shared zone that is permitted to be allocated collectively to a group of input ports. By the same token, a determination may be made at 514 as to what proportion of the group fraction is not currently allocated to any of the input ports of the group to which port n is assigned.

It may be convenient or desirable to define various types of groups of input ports for the purposes of making flow control determinations. For example, all ports of a same type (e.g., all Ethernet ports that operate at the same speed) could be assigned together to a group. As another possibility, all input ports that are connected to another switch could be assigned together to a group. It is not necessary that any particular one, or all, of the input ports be assigned to a group or groups.

In any event, it may next be determined, as indicated at 516, whether the proportion of the shared zone currently allocated to port n (as determined at 506) is greater than or equal to (i.e., not less than) the product of a constant L times the proportion of the group fraction that is not currently allocated to any input port of a group to which port n has been assigned (as may have been determined at 514). If a positive determination is made at 516 (i.e., it is determined that the amount of the shared zone used by port n is at least equal to L times the empty portion of the group fraction), then flow control may be asserted for port n, as indicated at 512.

In some embodiments, the constant L may be equal to the constant K. However, this is not required.

If no groups of input ports are arranged, then the operations indicated at 514 and 516 may be dispensed with.

If a negative determination is made at 516 (i.e., it is found that port n is using less than L times the empty portion of the group fraction), then it may be determined, as indicated at 518 (FIG. 5C), whether the proportion of the shared zone currently allocated to port n is not less than a specific maximum shared zone limit that may have been set for port n. If a positive determination is made at 518 (i.e., if it is determined that the usage of the shared zone by port n is at least equal to a specific maximum shared zone limit for port n), then flow control may be asserted for port n, as indicated at 520. (The flow control operation indicated at 520 may be the same as the flow control operation or operations discussed above in connection with 512.) If a negative determination is made at 518 (i.e., if it is determined that the usage of the shared zone by port n is less than any specific maximum shared zone limit for port n), then the procedure may be terminated with respect to port n (as indicated at 522) without flow control being asserted with respect to port n.

Referring again to the determination made at 502 (FIG. 5A), if a positive determination is made at that point (i.e., if it is determined that flow control is currently asserted for port n), it is then determined, as indicated at 524 (FIG. 5D), whether a packet has been received at port n. If so, then memory resources for storing the packet in the packet storage memory 104 are allocated from the overflow zone 206, as indicated at 526. (As noted above, packets may be received at ports for which flow control is currently asserted due to latency in the effectiveness of flow control operations.)

If a negative determination is made at 524, then it may be determined, as indicated at 528, whether port n is using only memory resources reserved for port n in the guarantee zone 202. If such is the case, then flow control for port n may be deasserted, as indicated at 530.

If it is determined at 528 that port n's usage of memory resources is not limited to the guarantee zone, then a further determination may be made, as indicated at 532, as to whether port n is using the overflow zone. If so, then the procedure may be terminated with respect to port n, as indicated at 534, with flow control remaining in place for port n. If a negative determination is made at 532 (i.e., if it is determined that port n is not using the overflow zone), then a determination may be made, as indicated at 536, as to the proportion of the shared zone currently allocated to port n. This may be done, for example, in the same manner as the determination made at 506 (FIG. 5A). It may next be determined, as indicated at 538 (FIG. 5E), whether the proportion of the shared zone currently allocated to port n is not less than a reduced specific shared zone limit that has been set for port n. If a positive determination is made at 538, then the procedure may be terminated with respect to port n (as indicated at 540) without deasserting flow control with respect to port n. However, if a negative determination is made at 538 (i.e., if the usage of the shared zone by port n is less than the reduced specific shared zone limit for port n), then a determination may be made, as indicated at 542, as to the proportion of the shared zone that is currently allocated to all of the input ports. This determination may be made, for example, in the same manner as the determination described in connection with 508 (FIG. 5A).

Next it may be determined, as indicated at 544, whether the proportion of the shared zone currently allocated to port n is not less than a constant N times the proportion of the shared zone that is not currently allocated to any of the input ports. If a positive determination is made at 544, then the procedure may be terminated with respect to port n (as indicated at 540) without deasserting flow control with respect to port n.

If a negative determination is made at 544 (i.e., if the amount of usage of the shared zone by port n is less than N times the empty portion of the shared zone), then it may be determined, as indicated at 546 (FIG. 5F) as to what proportion of a group fraction of the shared zone is currently allocated as to all of the input ports of a group to which port n is assigned. This determination may be made in the same manner as the determination described above in connection with 514 (FIG. 5B).

It may then be determined, as indicated at 548 (FIG. 5F), whether the proportion of the shared zone currently allocated to port n is not less than a constant M times the portion of the group fraction which is not currently allocated to any input port of the group to which port n is assigned. If a positive determination is made at 548, then the procedure may be terminated with respect to port n (as indicated at 550) without deasserting flow control with respect to port n.

If a negative determination is made at 548 (i.e., if the amount of usage of the shared zone by port n is less than M times the empty portion of the group fraction), then flow control may be deasserted with respect to port n, as indicated at 552. Thus, flow control may be deasserted with respect to port n if the proportion of the shared zone currently allocated to port n is less than each one of (a) the product of M times the proportion of the group fraction that is not currently allocated to any input port of the group to which port n is assigned, (b) the product of N times the proportion of the shared zone that is not currently allocated to any of the input ports of the communication switch, and (c) a reduced specific maximum shared zone limit that has been set for port n. In some embodiments, the reduced specific maximum shared zone limit may be nine-tenths of the specific maximum shared zone limit that has been set for port n; N may be equal to 0.9 times K; and M may be equal to 0.9 times L. By using a reduced specific maximum shared zone limit, a constant N that is less than K, and a constant M that is less than L for the purpose of determining whether to deassert flow control, the procedure may be provided with some degree of hysteresis so that there is less possibility of frequently deasserting and reasserting flow control with respect to a particular input port.

It should be understood that N need not equal 0.9* K and M need not equal 0.9* L. Rather, N may be equal to s*K, where s is any value greater than zero and less than one; M may be equal to t*L, where t is any value greater than zero and less than one; s need not equal t.

Figure 5E:
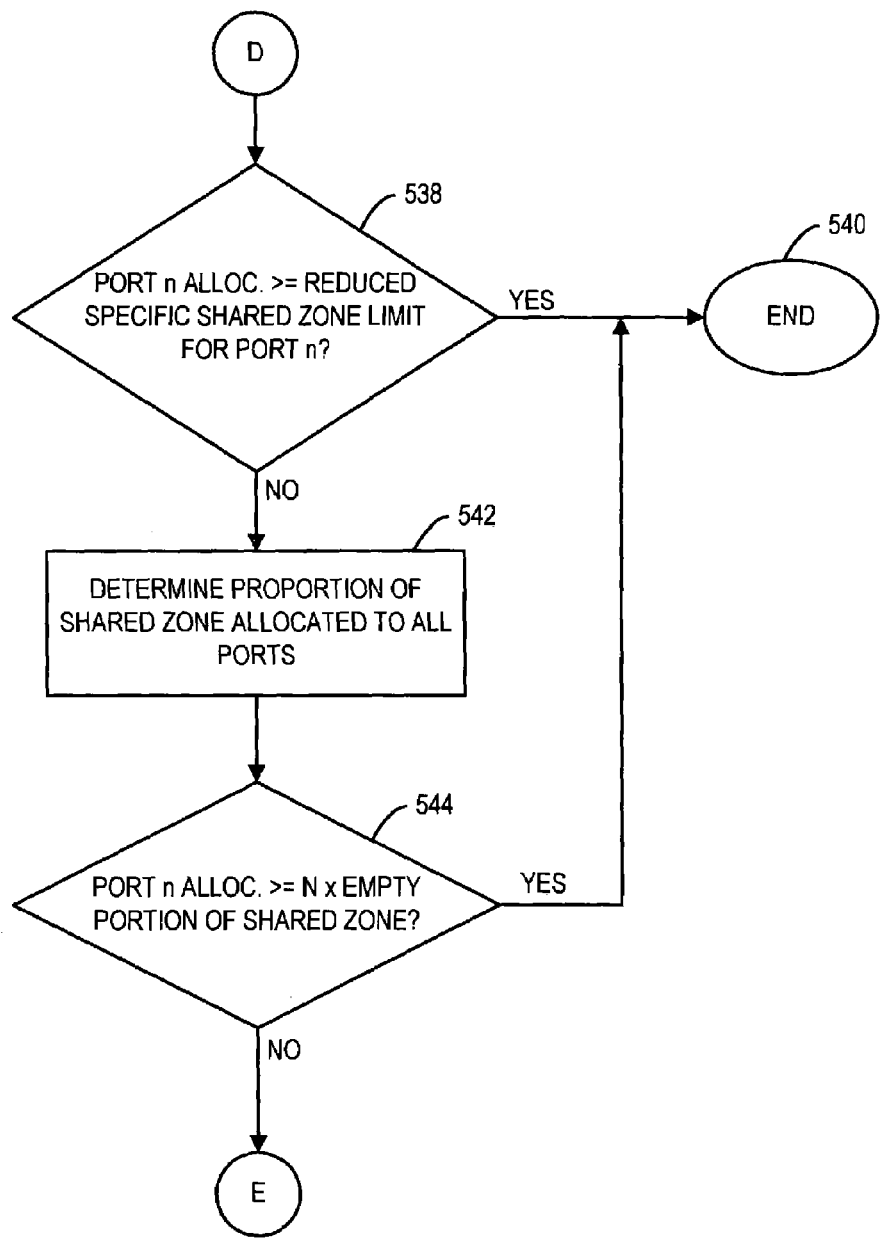
Figure 5F:
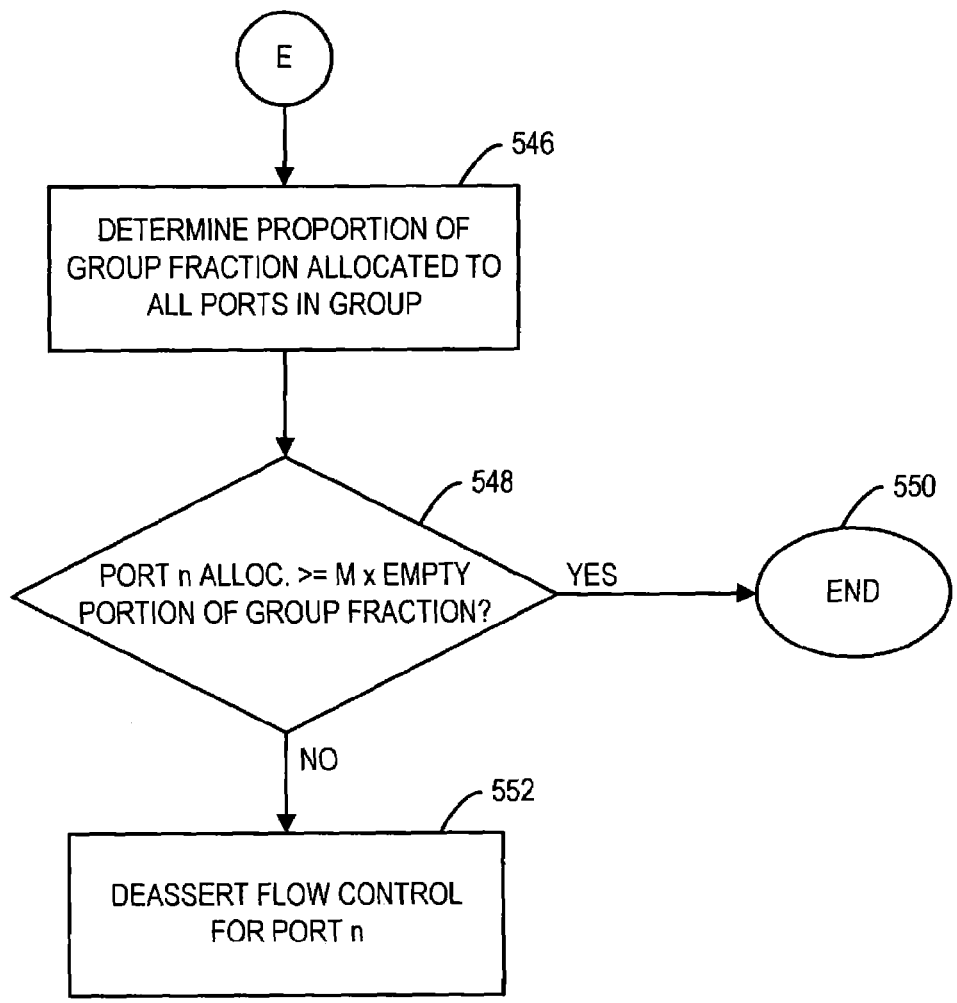

In some embodiments, the operations indicated at 544-552 in FIGS. 5E and 5F may be implemented by deasserting flow control when both of the following are true:

$$a < (K^* 0.9^* \{\text{size of shared zone} - b\}); \text{ and}$$

$$a < (L^* 0.9^* \{\text{size of group fraction} - \text{total shared zone usage by group}\}).$$

In other embodiments these operations may be modified, to aid in hardware implementation, such that flow control is deasserted when both of the following are true:

$$a < \{K^* 0.9^* \text{size of shared zone}\} - \{K^* b\}; \text{ and}$$

$$a < \{L^* 0.9^* \text{group fraction}\} - \{L^* \text{total shared zone usage by group}\}.$$

In some embodiments the control circuit 108 and the procedure of FIGS. 5A-5F may be implemented by suitably programming a general purpose processing device such as a microprocessor. It is well within the abilities of those who are skilled in the art to provide suitable software for such implementation, based on FIGS. 5A-5F and the accompanying description. In other embodiments, the control circuit 108 and the procedure of FIGS. 5A-5F may be implemented by all or a portion of an ASIC (application specific integrated circuit). It is well within the abilities of those who are skilled in the art to design suitable logic circuitry to perform the procedure, based on FIGS. 5A-5F and the accompanying description.

Figure 6:
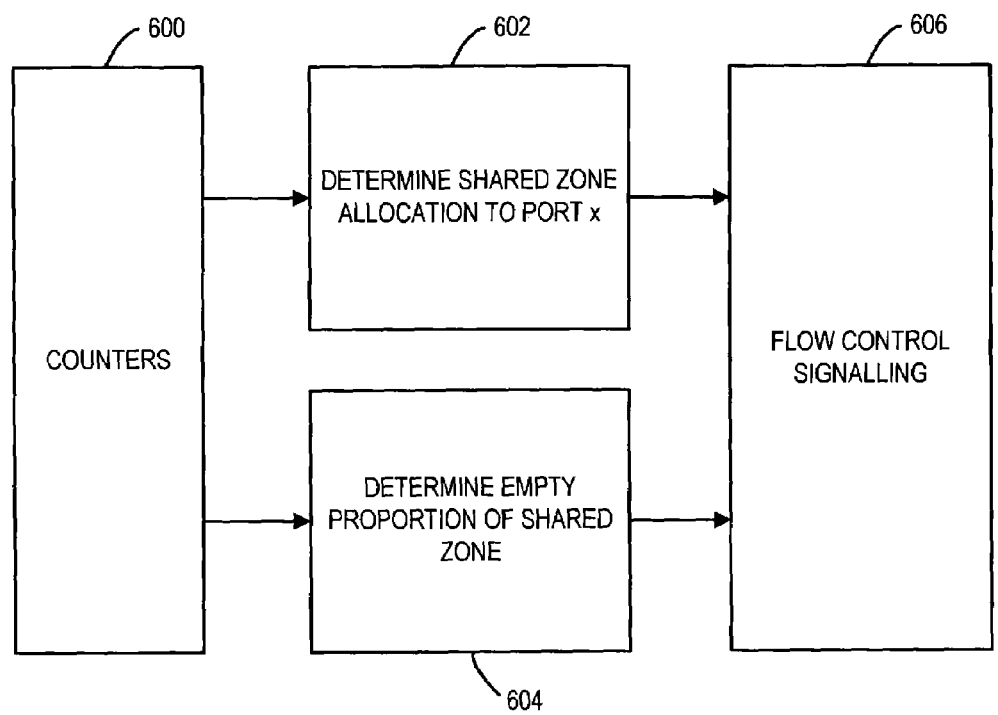
FIG. 6 is a block diagram which shows some components of a control circuit provided according to some embodiments as part of the data communication switch of FIG. 1.

FIG. 6 is a high level block diagram of at least a portion of such logic circuitry. In FIG. 6, block 600 represents counters that may be provided to indicate what proportion of the packet storage memory 104 (FIG. 1) or of the shared zone 204 (FIG. 2) is currently allocated to each of the input ports. Block 602 (FIG. 6) represents a circuit that is responsive to and/or receives data from, one or more of the counters 600 and is capable of determining a proportion of the shared zone (which may also be referred to as a "shared region") that is currently allocated to one or more of the input ports 102 (FIG. 1). Continuing to refer to FIG. 6, block 604 represents a circuit that is responsive to and/or receives data from one or more of the counters 600 and is capable of determining a proportion of the shared zone that is not currently allocated to any of the input ports 102. Block 606 represents a circuit that is responsive to circuits 602 and 604 and is capable of generating signals to assert or deassert flow control with respect to one or more of the input ports on the basis, for example, of the procedure of FIGS. 5A-5F.

The flow control procedure described above may provide one or more of the following advantages.

(1) By measuring congestion with respect to input ports rather than output ports, more effective and efficient use of shared memory may be provided.

(2) The procedure may respond adaptively to traffic conditions, without requiring tracking of traffic history. That is, the procedure may operate "statelessly" and may be simple to implement.

(3) The presence of the overflow zone may prevent dropping of packets, notwithstanding a degree of latency in asserting flow control.

(4) By allowing for grouping of input ports for some flow control determinations, different types of ports may be subjected to different memory usage regimes.

(5) The degree of aggressiveness of flow control may be tuned by varying the values of the constants K and/or L.

(6) By guaranteeing at least a minimum amount of memory resources to each input port, ports that contribute only in a small way to congestion may escape flow control.

(7) Overall fairness may be accomplished, and input ports that contribute the most to congestion are most likely to be flow-controlled, while still accommodating input ports with greater packet storage needs.

(8) A 100% load may be maintained at the output ports.

In one embodiment, a data communication switch having 28 input ports (e.g., 24 10/100 Megabit ports and 4 Gigabit ports) may be satisfactorily served with 512 kilobytes of packet storage memory. By contrast, 4 megabytes of packet storage memory may be required for satisfactory operation in the absence of the flow control procedure described above. With the 512 kilobyte packet storage memory, 4K may be assigned to each of the 10/100 ports as guaranteed memory resources and 20K may be assigned to each of the Gigabit ports as guaranteed memory resources, for a total guarantee zone, in some embodiments, of 176K. The overflow zone may be sized, for example, to provide 3K or less per port.

The embodiments described above utilize simple linear functions to delimit the "forbidden area" 310 which triggers assertion of flow control. However, more complex functions may be employed to delimit the forbidden area, such as combinations of linear segments of different slopes, or functions that include one or more curved segments.

As used herein and in the appended claims, a "shared memory space" may refer to a subset (such as shared zone 204, FIG. 2) of a packet storage memory.

The embodiments described above relate to allocating packet storage memory in a data communication switch among a plurality of input ports. However, the above described procedure may be readily adapted to govern allocation of types of shared resources other than a packet storage memory among types of competing applicants other than input ports of a data communication switch. For example, the described procedure may be employed to allocate guaranteed bandwidth among various flows in a communication channel, or to allocate memory among various processes in a computing system.

Thus, in some embodiments, a method of allocating a shared resource among a plurality of competing applicants may include limiting a share of the resource allocated to one of the applicants on the basis of a current proportion of the resource allocated to the one of the applicants and a total of respective shares of the resource currently allocated to all of the applicants.

In some embodiments, a method of allocating a shared resource among a plurality of competing applicants may include foreclosing further allocation of the shared resource to one of the competing applicants when a proportion of the shared resource currently allocated to the one of the competing applicants is at least as great as the product of a constant K times a proportion of the shared resource that is not currently allocated to any of the competing applicants.

In some embodiments, a method includes determining a proportion of a shared memory space currently allocated to a first input port of a data communication switch, determining a proportion of the shared memory space that is not currently allocated to any input port of the data communication switch; and asserting flow control with respect to the first input port if the proportion of the shared memory space currently allocated to the first input port is not less than a quantity obtained by performing a calculation with respect to the proportion of the shared memory space that is not currently allocated to any input port of the data communication switch.

In some embodiments, a method includes determining a proportion of a shared memory space currently allocated to a first input port of a data communication switch, determining a proportion of the shared memory space that is not currently allocated to any input port of the data communication switch, and asserting flow control with respect to the first input port if the proportion of the shared memory space currently allocated to the first input port is not less than the product of a constant K times the proportion of the shared memory space that is not currently allocated to any input port of the data communication switch.

The several embodiments described herein are solely for the purpose of illustration. The various features described herein need not all be used together, and any one or more of those features may be incorporated in a single embodiment. Therefore, persons skilled in the art will recognize from this description that other embodiments may be practiced with various modifications and alterations.

What is claimed is:

1. A method comprising:
    determining a proportion of a shared memory space currently allocated to a first input port of a data communication switch;
    determining a proportion of the shared memory space that is not currently allocated to any input port of the data communication switch;
    asserting flow control with respect to the first input port if the proportion of the shared memory space currently allocated to the first input port is not less than a quantity obtained by performing a calculation with respect to the proportion of the shared memory space that is not currently allocated to any input port of the data communication switch; and
    allocating a portion of an overflow zone to the first input port in regard to at least one data packet received at the first input port at a time when flow control is asserted with respect to the first input port.

2. The method of claim 1, wherein the performing of the calculation includes multiplying the proportion of the shared memory space that is not currently allocated to any input port of the data communication switch by a constant K, K≠1.

3. A method comprising:
    determining a proportion of a shared memory space currently allocated to a first input port of a data communication switch;
    determining a proportion of the shared memory space that is not currently allocated to any input port of the data communication switch;
    asserting flow control with respect to the first input port if the proportion of the shared memory space currently allocated to the first input port is not less than the product of a constant K times the proportion of the shared memory space that is not currently allocated to any input port of the data communication switch; and
    allocating a portion of an overflow zone to the first input port in regard to at least one data packet received at the first input port at a time when flow control is asserted with respect to the first input port.

4. The method of claim 3, wherein K=1.

5. A data communication switch, comprising:
    a plurality of input ports;
    a packet storage memory coupled to the plurality of input ports; and
    a control circuit coupled to the plurality of input ports and the packet storage memory, the control circuit operative to:
        determine a proportion of a shared region of the packet storage memory that is currently allocated to a first one of the input ports;
        determine a proportion of the shared region of the packet storage memory that is not currently allocated to any of the input ports;
        assert flow control with respect to the first one of the input ports if the proportion of the shared region of the packet storage memory currently allocated to the first one of the input ports is not less than a quantity obtained by performing a calculation with respect to the proportion of the shared region of the packet storage memory that is not currently allocated to any of the input ports; and
        allocate a portion of an overflow zone to the first one of the input ports in regard to at least one data packet received at the first one of the input ports at a time when flow control is asserted with respect to the first one of the input ports.

6. The data communication switch of claim 5, wherein the performing of the calculation includes multiplying the proportion of the shared memory space that is not currently allocated to any input port of the data communication switch by a constant K, K≠1.

7. The data communication switch of claim 6, wherein K is selected from the group consisting of 2 and 0.5.

8. A data communication switch, comprising:
    a plurality of input ports;
    a packet storage memory coupled to the plurality of input ports; and
    a control circuit coupled to the plurality of input ports and the packet storage memory, the control circuit operative to:
        determine a proportion of a shared region of the packet storage memory that is currently allocated to a first one of the input ports;
        determine a proportion of the shared region of the packet storage memory that is not currently allocated to any of the input ports;
        assert flow control with respect to the first one of the input ports if the proportion of the shared region of the packet storage memory currently allocated to the first one of the input ports is not less than the product of a constant K times the proportion of the shared region of the packet storage memory that is not currently allocated to any of the input ports; and
        allocate a portion of an overflow zone to the first input port in regard to at least one data packet received at the first input port at a time when flow control is asserted with respect to the first input port.

9. The data communication switch of claim 8, wherein K=1.

10. A data communication switch, comprising:
    a plurality of input ports;
    a packet storage memory coupled to the plurality of input ports; and
    a control circuit coupled to the plurality of input ports and the packet storage memory, the control circuit operative to:
        determine a proportion of a shared region of the packet storage memory that is currently allocated to a first one of the input ports;
        determine a proportion of the shared region of the packet storage memory that is not currently allocated to any of the input ports;
        assert flow control with respect to the first one of the input ports if the proportion of the shared region of the packet storage memory currently allocated to the first one of the input ports is not less than the product of a constant K times the proportion of the shared region of the packet storage memory that is not currently allocated to any of the input ports;

determine a proportion of a group fraction of the packet storage memory that is not currently allocated to any input port of a group to which the first one of the input ports is assigned;

assert flow control with respect to the first one of the input ports if the proportion of the shared region of the packet storage memory currently allocated to the first one of the input ports is not less than the product of a constant L times the proportion of the group fraction of the packet storage memory that is not currently allocated to any input port of the group to which the first one of the input ports is assigned; and assert flow control with respect to the first one of the input ports if the proportion of the shared region of the packet storage memory is not less than a specific limit assigned to the first one of the input ports.

11. The data communication switch of claim 10, wherein K=L.

12. A data communication switch, comprising:
a plurality of input ports;
a packet storage memory coupled to the plurality of input ports; and
control means coupled to the plurality of input ports and the packet storage memory, the control means for:
determining a proportion of a shared region of the packet storage memory that is currently allocated to a first one of the input ports;
determining a proportion of the shared region of the packet storage memory that is not currently allocated to any of the input ports;
asserting flow control with respect to the first one of the input ports if the proportion of the shared region of the packet storage memory currently allocated to the first one of the input ports is not less than the product of a constant K times the proportion of the shared region of the packet storage memory that is not currently allocated to any of the input ports; and
allocating a portion of an overflow zone to the first one of the input ports in regard to at least one data packet received at the first one of the input ports at a time when flow control is asserted with respect to the first one of the input ports.

13. The data communication switch of claim 12, wherein K=1.

14. The data communication switch of claim 12, wherein K is selected from the group consisting of 2 and 0.5.

15. A control circuit, comprising:
first means for determining a proportion of a shared region of a packet storage memory that is currently allocated to a first one of a plurality of input ports;
second means for determining a proportion of the shared region of the packet storage memory that is not currently allocated to any of the input ports;
means, responsive to the first and second means, for asserting flow control with respect to the first one of the input ports if the proportion of the shared region of the packet storage memory currently allocated to the first one of the input ports is not less than the product of a constant K times the proportion of the shared region of the packet storage memory that is not currently allocated to any of the input ports; and
means for allocating a portion of an overflow zone to the first one of the input ports in regard to at least one data packet received at the first one of the input ports at a time when flow control is asserted with respect to the first one of the input ports.

16. The control circuit of claim 15, wherein K=1.

17. The control circuit of claim 15, wherein K is selected from the group consisting of 2 and 0.5.

18. A control circuit, comprising:
a first circuit capable of determining a proportion of a shared region of a packet storage memory that is currently allocated to a first one of a plurality of input ports;
a second circuit capable of determining a proportion of the shared region of the packet storage memory that is not currently allocated to any of the input ports;
a third circuit, responsive to the first and second circuits, and capable of asserting flow control with respect to the first one of the input ports if the proportion of the shared region of the packet storage memory currently allocated to the first one of the input ports is not less than the product of a constant K times the proportion of the shared region of the packet storage memory that is not currently allocated to any of the input ports; and
a fourth circuit capable of allocating a portion of an overflow zone to the first one of the input ports in regard to at least one data packet received at the first one of the input ports at a time when flow control is asserted with respect to the first one of the input ports.

19. The control circuit of claim 18, wherein K=1.

20. The control circuit of claim 18, wherein K is selected from the group consisting of 2 and 0.5.

21. An apparatus, comprising:
a storage medium having stored thereon instructions that when executed by a machine result in the following:
determining a proportion of a shared region of a packet storage memory that is currently allocated to a first one of a plurality of input ports;
determining a proportion of the shared region of the packet storage memory that is not currently allocated to any of the input ports;
asserting flow control with respect to the first one of the input ports if the proportion of the shared region of the packet storage memory currently allocated to the first one of the input ports is not less than the product of a constant K times the proportion of the shared region of the packet storage memory that is not currently allocated to any of the input ports; and
allocating a portion of an overflow zone to the first one of the input ports in regard to at least one data packet received at the first one of the input ports at a time when flow control is asserted with respect to the first one of the input ports.

22. The apparatus of claim 21, wherein K=1.

23. The apparatus of claim 21, wherein K is selected from the group consisting of 2 and 0.5.

24. A data communication switch, comprising:
a plurality of input ports;
a packet storage memory coupled to the plurality of input ports;
a plurality of output ports coupled to the packet storage memory; and
a control circuit coupled to the input ports, to the packet storage memory, and to the output ports, the control circuit operative to:
partition the packet storage memory into (a) a guarantee zone which comprises a plurality of guaranteed memory resources each set aside for a respective one of the input ports, (b) a shared zone, and (c) an overflow zone;

determine whether a first one of the input ports has exceeded the guaranteed memory resource set aside for the first one of the input ports in the guarantee zone;

determine a proportion of the shared zone that is currently allocated to the first one of the input ports;

determine a proportion of a group fraction of the shared zone that is not currently allocated to any input port of a group to which the first one of the input ports is assigned;

assert flow control with respect to the first one of the input ports if a proportion of the shared zone currently allocated to the first one of the input ports is not less than the product of a constant L times the proportion of the group fraction of the shared zone that is not currently allocated to any input port of the group to which the first one of the input ports is assigned;

determine a proportion of the shared zone that is not currently allocated to any of the input ports;

assert flow control with respect to the first one of the input ports if the proportion of the shared zone currently allocated to the first one of the input ports is not less than the product of a constant K times the proportion of the shared zone that is not currently allocated to any of the input ports;

set a specific maximum shared zone limit for the first one of the input ports;

assert flow control with respect to the first one of the input ports if the proportion of the shared zone currently allocated to the first one of the input ports is not less than the specific maximum shared zone limit for the first one of the input ports; and allocate a portion of the overflow zone to the first one of the input ports in regard to at least one data packet received at the first one of the input ports at a time when flow control is asserted with respect to the first one of the input ports.

25. The data communication switch of claim 24, wherein the control circuit is further operative to;

deassert flow control with respect to the first one of the input ports if the proportion of the shared zone currently allocated to the first one of the input ports is less than each one of: (a) the product of a constant M times the proportion of the group fraction of the shared zone that is not currently allocated to any input port of the group to which the first one of the input ports is assigned (M being less than L), (b) the product of a constant N times the proportion of the shared zone that is not currently allocated to any of the input ports (N being less than K), and (c) a reduced specific maximum shared zone limit for the first one of the input ports, the reduced specific maximum shared zone limit being less than the specific maximum shared zone limit.

26. The data communication switch of claim 25, wherein $M=0.9 \times L$, $N=0.9 \times K$, and the reduced specific maximum shared zone limit is nine-tenths of the specific maximum shared zone limit.

27. The data communication switch of claim 25, wherein the control circuit is further operative to deassert flow control with respect to the first one of the input ports if no portion of the shared zone is currently allocated to the first one of the input ports.

28. The data communication switch of claim 24, wherein $K=L=1$.

* * * * *